United States Patent
Sharaga et al.

(10) Patent No.: US 9,258,344 B2
(45) Date of Patent: Feb. 9, 2016

(54) MULTI-HOP SINGLE SIGN-ON (SSO) FOR IDENTITY PROVIDER (IDP) ROAMING/PROXY

(75) Inventors: Avishay Sharaga, Bet Nehemya (IL); Achim Luft, Braunschweig (DE)

(73) Assignees: Intel Corporation, Santa Clara, CA (US); Intel Deutschland GmbH, Neubiberg (DE)

( * ) Notice: Subject to any disclaimer, the term of this patent is extended or adjusted under 35 U.S.C. 154(b) by 141 days.

(21) Appl. No.: 13/995,118

(22) PCT Filed: Dec. 19, 2011

(86) PCT No.: PCT/US2011/065903
§ 371 (c)(1),
(2), (4) Date: Jun. 17, 2013

(87) PCT Pub. No.: WO2013/019261
PCT Pub. Date: Feb. 7, 2013

(65) Prior Publication Data
US 2013/0276085 A1 Oct. 17, 2013

Related U.S. Application Data

(60) Provisional application No. 61/514,009, filed on Aug. 1, 2011.

(51) Int. Cl.
*H04L 29/06* (2006.01)
*H04L 29/08* (2006.01)

(52) U.S. Cl.
CPC ............ *H04L 65/60* (2013.01); *H04L 63/0815* (2013.01); *H04L 63/0884* (2013.01); *H04L 65/1069* (2013.01); *H04L 65/601* (2013.01); *H04L 67/148* (2013.01); *H04L 67/303* (2013.01); *H04L 63/102* (2013.01); *H04L 65/80* (2013.01)

(58) Field of Classification Search
None
See application file for complete search history.

(56) References Cited

U.S. PATENT DOCUMENTS

| | | | |
|---|---|---|---|
| 7,849,204 B2 * | 12/2010 | Yared | G06F 21/41 709/217 |
| 7,958,347 B1 | 6/2011 | Ferguson | |
| 8,910,244 B2 * | 12/2014 | Zheng | H04L 63/0884 726/3 |
| 2004/0128506 A1 * | 7/2004 | Blakley et al. | 713/170 |
| 2004/0205243 A1 * | 10/2004 | Hurvig et al. | 709/245 |
| 2006/0053296 A1 * | 3/2006 | Busboom et al. | 713/182 |
| 2006/0178994 A1 * | 8/2006 | Stolfo et al. | 705/50 |
| 2006/0206932 A1 | 9/2006 | Chong | |
| 2006/0218628 A1 * | 9/2006 | Hinton et al. | 726/8 |
| 2007/0136786 A1 * | 6/2007 | Le Van Gong | G06F 21/33 726/3 |
| 2008/0021866 A1 * | 1/2008 | Hinton et al. | 707/2 |
| 2008/0021997 A1 * | 1/2008 | Hinton | 709/225 |
| 2009/0089625 A1 * | 4/2009 | Kannappan et al. | 714/39 |
| 2009/0217368 A1 * | 8/2009 | Buss | G06F 21/34 726/9 |
| 2010/0154046 A1 * | 6/2010 | Liu et al. | 726/8 |

(Continued)

OTHER PUBLICATIONS

International Search Report and Written Opinion mailed Sep. 14, 2012 from International Application No. PCT/US2011/065903.

(Continued)

*Primary Examiner* — Michael R Vaughan
(74) *Attorney, Agent, or Firm* — Schwabe, Williamson & Wyatt, P.C.

(57) ABSTRACT

Embodiments of the present disclosure describe methods, apparatuses, and systems related to using an identity provider (IdP) as a proxy for another IdP. Other embodiments may be described and/or claimed.

8 Claims, 4 Drawing Sheets

(56) References Cited

U.S. PATENT DOCUMENTS

| | | | |
|---|---|---|---|
| 2011/0202986 A1* | 8/2011 | Horn et al. | 726/7 |
| 2012/0005739 A1* | 1/2012 | Kassaei | 726/8 |
| 2012/0011578 A1* | 1/2012 | Hinton et al. | 726/8 |
| 2012/0072979 A1* | 3/2012 | Cha et al. | 726/7 |
| 2013/0179573 A1* | 7/2013 | McCarty | H04L 63/0823 709/225 |
| 2014/0101743 A1* | 4/2014 | Busboom | H04L 63/083 726/7 |

OTHER PUBLICATIONS

International Preliminary Report on Patentability for PCT Application No. PCT/US2011/065903, dated Feb. 13, 2014, 7 pages.

* cited by examiner

MULTI-HOP SINGLE SIGN-ON (SSO) FOR IDENTITY PROVIDER (IDP) ROAMING/PROXY

CROSS REFERENCE TO RELATED APPLICATIONS

The present application is a national phase entry under 35 U.S.C. §371 of International Application No. PCT/US2011/065903, filed Dec. 19, 2011, entitled "MULTI-HOP SINGLE SIGN-ON (SSO) FOR IDENTITY PROVIDER (IdP) ROAMING/PROXY", which designates the United States of America, and which claims priority to U.S. Provisional Patent Application No. 61/514,009, filed Aug. 1, 2011, the entire contents and disclosures of which are hereby incorporated by reference in their entireties.

FIELD

Embodiments of the present disclosure generally relate to the field of network communication systems, and more particularly but not exclusively, relates to identity management using single sign-on (SSO) techniques in a wireless communication system.

BACKGROUND

Single sign-on (SSO) techniques have become commonly used to enable a user to log in once and then gain access to other systems/services without having to log in again at each system or at each device/service in the system(s). Several standards/protocols have been written to address SSO usage, such as OpenID and Liberty Alliance.

With SSO, the user creates an identity by opening an account within an Identity Provider (IdP) and then uses this account to access other various Internet services without having to subscribe (e.g., create another account) to every one of the services. The IdP may be an entity that provides pure identity management or any Application Service Provider (ASP) that adds an identity management service to its portfolio of services. For example, FACEBOOK is a social networking ASP that also provides identity management services. Although most users open a FACEBOOK account in order to use FACEBOOK, the users may also use their FACEBOOK account to access other ASP(s) (referred to as a "Relaying Party" or RP in the SSO schemes) by using the "connect with FACEBOOK" options that appear in the user's FACEBOOK pages.

This service to provide identity management is attractive to users and to ASPs, and hence there are many identity management services available today. More ASPs and/or other entities wish to enter this space so as to provide better user experience and to attract more users to their services.

A problem is that the same user connecting to the same ASP (RP) or web service from different IdPs are identified as different users. and thus are not able to have/access/use the same content in the local account at the RP or web service. Although some ASPs have identified this issue and allow the user to configure several allowed IdPs/identities in the user's local account, this solution is not scalable, is not user friendly, and decreases the attractiveness of SSO to the users since the users need to create and manage their account in each of the various RPs or web services, and each account may require/recognize only specific IdPs/identities.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
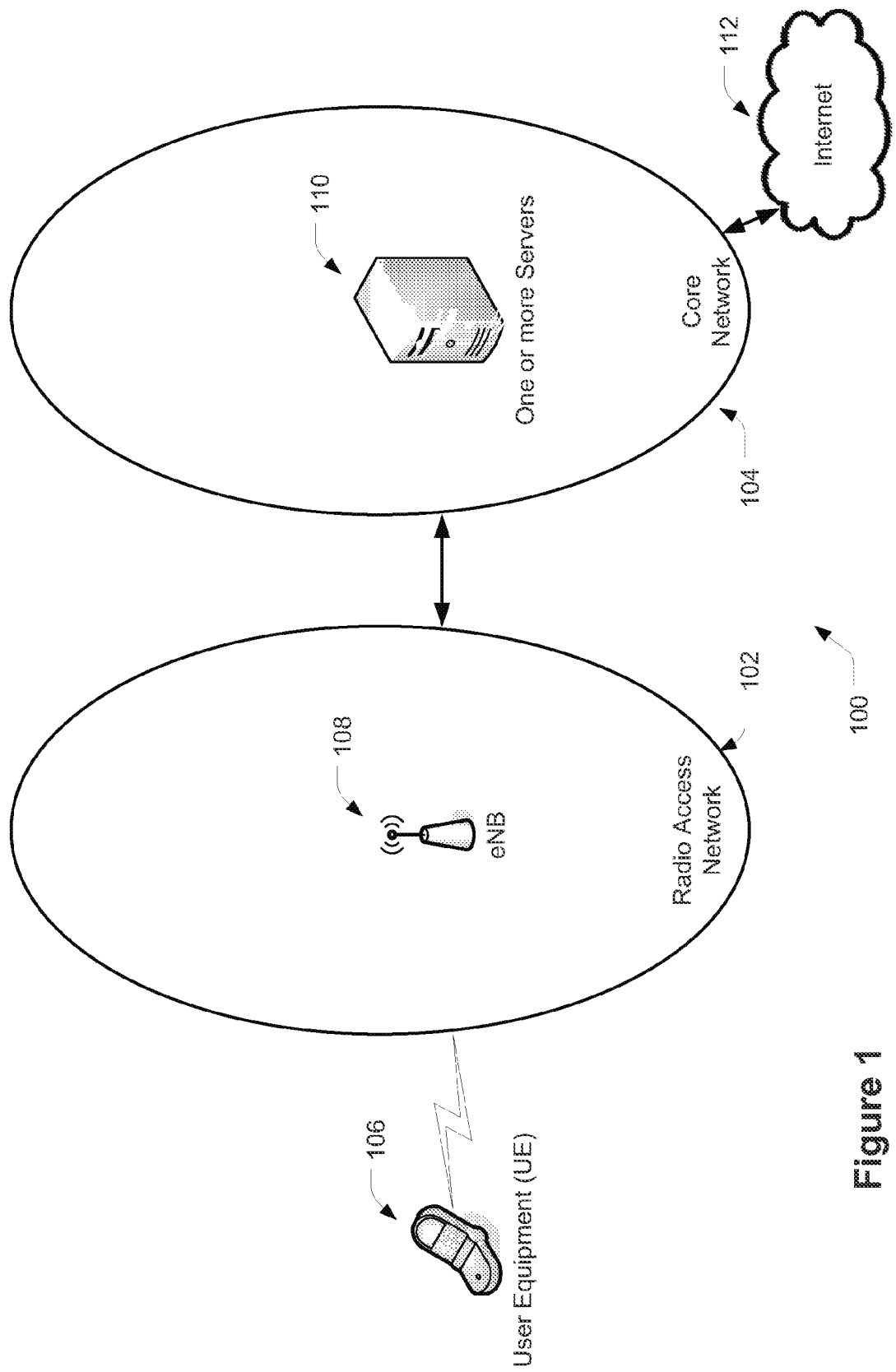
FIG. 1 illustrates a broadband wireless access network in accordance with some embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "component" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

In some embodiments, a method provides a scheme/protocol that establishes roaming/proxy relationships between two or more Identity Providers (IdPs) and allows a user to maintain his/her existing IdPs and accounts if and when the user subscribes to another IdP. Thus, if the user wishes to access a particular service that recognizes only a specific identity of the user, a proxy method of one embodiment enables the user to use any of the user's identities to ultimately access that specific service. Thus, any one or more of the identities can be used for single sign-on (SSO) to access the specific service, without requiring the user to log in or subscribe multiple times using different identities.

For example, the user may have more than one IdP, and each IdP may in turn provide a different identity for the user (e.g., for the case of first and second IdPs, the user may be provided with respective identities of John.Doe@FACEBOOK.com and John.Doe@Operator.com). The user may also have several subscriptions to various services (such as web-based services) where some subscriptions are based on the first IdP (corresponding to the John.Doe@FACEBOOK.com identity, for example) and other subscriptions are based on the second or other IdPs (corresponding to the John.Doe@Operator.com, etc. identity, for example). An embodiment of the proxy method enables the user to connect to the user's existing local account on each of the services using either identity, without the need for the user to create/reconfigure the local accounts in each web service to recognize additional identities and without the need to remove the user's identity from one IdP and register that identity in another IdP. The user may thus get authenticated/authorized to access a particular service based on a first identity recognized by the web service and provided by the first IdP, which is acting as a proxy for the second IdP providing the second IdP that is desired to be used by the user for SSO purposes. The scheme/protocol using the proxy relationship therefore provides a transparent and scalable technique to implement single sign-on (SSO) without requiring the user to create/reconfigure the user's local accounts for each web service that the user wishes to access.

In some embodiments, the scheme/protocol may involve communication within a wireless network that is configured to support $3^{rd}$ Generation Partnership Project (3GPP) standards and/or other communication standards or protocols. For example with a 3GPP implementation, a 3GPP user is able to use all of his/her IdPs that existed prior to the user's joining a 3GPP service, without the need to provide a new username/password for new (or existing) services that the user wishes to access using 3GPP.

The second IdP (such as a 3GPP-based IdP that provides SSO capability) of one embodiment is able to provide the user with a simple and attractive experience. The second IdP may do this by providing identity management services that attract users to the second IdP's services wherein the user may already have an IdP subscription with the first IdP or with other IdPs, yet the user is able to continue to use all identities provided by the various IdPs.

A user may have more than one IdP, for example, since the same or similar web services may be provided by many ASPs or other entities. Hence, in a manner somewhat analogous to users having several email addresses, users may have more than one IdP (and so may have multiple identities). One reason for having multiple identities may be that not all web services may work with all IdPs, and thus, the user may have several identities, some of which are used for certain web services an others of which are used for other web services.

Other embodiments of the present disclosure may include other devices, apparatuses, systems, and/or methods.

FIG. 1 illustrates an example broadband wireless access (BWA) network 100 in accordance with some embodiments. The BWA network 100 may be used to implement the various embodiments of the proxy method and proxy device(s) described herein. The BWA network 100 may include a radio access network (RAN) 102 and a core network 104. The RAN 102 and/or core network 104 may be Internet Protocol (IP)-based networks in one embodiment.

User equipment (UE) 106 may access the core network 104 via a radio link ("link") with a base station (BS) such as, for example, an enhanced node base station (eNB) 108 in the RAN 102. The core network 104 may have one or more servers 110 to communicatively couple the RAN 102 with a wider network (e.g., the Internet 112).

The BWA network 100 is shown with certain components to facilitate discussion of the various features of the embodiments. However, the BWA network 100 may include a large number of other components such as, but not limited to, gateways, servers, agents, modules, other network devices, etc.

Components of the BWA network 100 may operate in conformance with the 3GPP long-term evolution (LTE) project along with any amendments, updates, and/or revisions (e.g., LTE—Advanced (LTE-A), ultra mobile broadband (UMB) project (also referred to as "3GPP2"), etc.). The BWA network 100 may be referred to as an Evolved Universal Mobile Telecommunications Systems (UMTS) Terrestrial Radio Access Network (e-UTRAN) if configured to operate in conformance with 3GPP LTE. In other embodiments, components described herein may be compatible with additional/alternative communication standards, specifications, and/or protocols, other than or usable with 3GPP. Furthermore in some embodiments, the proxy method and devices described herein may be implemented in wired communication networks that may or may not include some wireless links, and may also be implemented with other types of network technologies such as WiMAX, WifFi, and so forth.

While FIG. 1 generally depicts the UE 106 as a phone, in various embodiments the UE 106 may be a personal computer (PC), a notebook, an ultra mobile PC (UMPC), a handheld mobile device, an universal integrated circuit card (UICC), a personal digital assistant (PDA), a Customer Premise Equipment (CPE), a tablet, or other wireless or wired consumer electronics device such as MP3 players, digital cameras, and the like.

An IdP, an Application Service Provider (ASP), a Relaying Party (RP), an entity that provides a service (such as a web service), or various other parties may operate or own the servers 110 in the core network 104 and/or other servers or network devices in the Internet 112. Such parties may provide a website that is accessible by a browser installed in the UE 106 or otherwise accessible by the UE 106, so as to enable the user of the UE 106 to access the services/products provided via the website of the parties. Examples of an IdP can include FACEBOOK (at FACEBOOK.com), a 3GPP-based IdP (e.g., an entity that provides one or more network devices configured to perform identity management using 3GPP communication techniques in a 3GPP-enabled communication network), or any other entity capable of providing identities to the user, with or without SSO capability. Examples of the entities (including some RPs and ASPs) that can provide a service (such as a web service) may include YouTube, Flickr, various blogs, or others wherein the user can create a local account for the service(s). Such entities may also operate in multiple roles as an IdP, RP, ASP, etc.

Hereinafter to facilitate the understanding of the features of the various embodiments, a first IdP (such as FACEBOOK or other existing/older IdP or ASP) that has provided the user with a first identity will be at times referred to as "XYZ.com" for illustrative purposes. Another IdP (such as a 3GPP-based IdP or ASP) that has provided the user with a second identity, which may be newer or more recent than the first identity and different from the first identity, will be at times referred to herein as the second identity provider (second IdP) for illustrative purposes. An entity that provides a service (such as YouTube, Flickr, etc. that provides web-based services) will be at times referred to herein as "FOO" (at FOO.com) for illustrative purposes.

Figure 2:
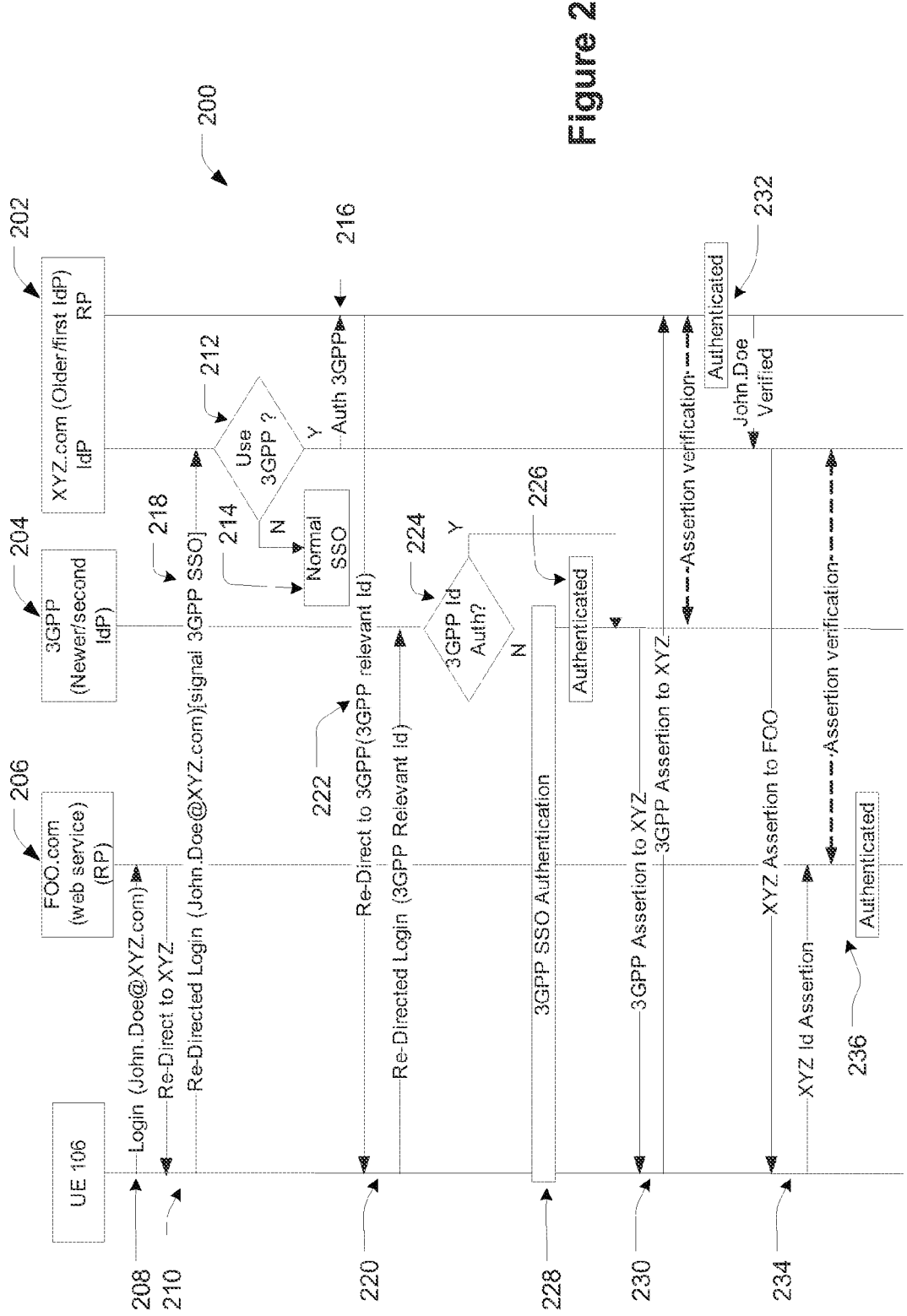
FIG. 2 illustrates a proxy communication method using single sign-on (SSO) in accordance with some embodiments that may be used in the broadband wireless access network of FIG. 1.

FIG. 2 illustrates a proxy communication method 200 in accordance with various embodiments. As noted previously above, the various operations depicted in the method 200 (as well as in a method 300 in FIG. 3) need not necessarily occur in the exact order that is shown. Furthermore, certain operations may be added, removed, or modified in some embodiments.

According to one embodiment, some of the operations depicted in the method 200 (as well as in a method 300 in FIG. 3) may be performed or caused to be performed by execution of software or other computer-readable instructions stored on a tangible and non-transitory computer-readable medium (such as a memory). One or more processors may execute the software in such embodiments. The processor(s) may be located at the UE 106, at the server(s) 110, and/or at network devices at other locations in the BWA network 100. For instance, the operations performed at or on behalf of XYZ.com, FOO.com, the second IdP, etc. may be performed by one or more processors located at servers or other network devices provided by these entities.

The various messages and communication exchanges shown in FIG. 2 (as well as in FIG. 3) may occur in one embodiment over wireless links, such as wireless communications using 3GPP protocols/standards. In other embodiments, the various messages and communication exchanges may occur over wired communication links or over a combination of wired and wireless communication links. The various communication links shown in FIG. 2-3, such as the links between IdPs, may include Internet Protocol Security (IPsec) tunnels in one embodiment.

Initially, one or more of the following assumptions are made for an embodiment for purposes of explaining the embodiment(s) of the methods 200 and 300:

The user at the UE 106 has more than one IdP (which in turn may provide SSO capability), and each IdP provides a different identity for the user (e.g., for the case of two IdPs: a first identity John.Doe@XYZ.com is provided by a first IdP 202 at XYZ.com and a second identity John.Doe@Operator.com is provided at a second IdP 204, which may be a 3GPP-based entity in one embodiment);

The user has several web subscriptions, some of which recognize or are otherwise based on his first IdP providing the first identity John.Doe@XYZ.com and other ones that recognize or are otherwise based on his second IdP (or third or forth etc. IdP) providing the second identity John.Doe@Operator.com etc. In FIG. 2, the user has a subscription and local account at a web service 206 (FOO.com) that recognizes the user's first identity John.Doe@XYZ.com but may not recognize the user's second identity John.Doe@Operator.com or other identities.

The user wishes to be able to connect to the user's existing local account for the web service 206 at FOO.com using either the first identity or the second identity (or other identity), without the need to create/reconfigure the local account at the web service 206 to recognize/use the second identity and without the need to remove his first identity from the first IdP 202 and register it with the second IdP 202 (or with other IdPs) or vice versa.

In one embodiment of the method 200 of FIG. 2, a proxy/roaming relationship is created between two or more IdPs (e.g., between the first IdP 202 and the second IdP 204), wherein the first IdP 202 is configured to operate as a proxy for the second IdP 204. With this proxy relationship, the user of the UE 106 is able to be authenticated using a newer (the second) identity provided by the second IdP 204 for the web service 206 that is configured to: (1) identify the user by the user's older (the first) identity provided by the first IdP 202 and/or (2) have a "trusted" relationship with the first IdP 202. With respect to a "roaming" example according to one embodiment, the user of the UE 106 may move from one geographic region to another and still use the second identity (provided by the second IdP 204) to access the particular geographic region's web services that may recognize/use identities provided by other (first) IdP(s) such other IdP(s) may act as a proxy for the second IdP 204 so as to authenticate the UE 106 to the web services as the user moves/roams between geographic areas.

In one embodiment, a "special" subscription is created and stored in the first IdP 202 (XYZ.com) using information pertaining to the second identity and provided by the second IdP 204 so as to enable this second identity to be linked/associated with the first identity. As a result, the first IdP 202 (in response to receiving an authentication request for the first identity) can check the information in the stored subscription to recognize the user's second identity. This subscription therefore enables the user of the UE 106 to be "proxy" authenticated by the second IdP 204 even though the web service 206 receives the first identity linked to the first IdP 202 and redirects an authentication request to the first IdP 202, as will be described below. As such, the "special" subscription enables the first IdP 202 to be both a IdP system and also a relaying party (RP) for the IdP system of the second IdP 204. In such embodiment(s) therefore, the first IdP 202 includes the functionality of the IdP and RP combined with the proxy SSO functionality.

Turning now to the specific operations and communication exchanges of one embodiment of the method 200 of FIG. 2, the user of the UE 106 attempts at 208 to access and authenticate to the web service 206, using for example a browser installed in the UE 106 to connect (log in) to a server that provides the web service 106. The user has and prefers to use (implicitly or explicitly) the second identity (e.g., John.Doe@Operator.com) that is provided by the second IdP 204 to access the webs service 206, but the user's account at the web service 206 is configured to use/recognize the first identity (e.g., John.Doe@XYZ.com provided by the first IdP 202).

At 210, the web service 206 instructs the UE 106 to redirect the user's authentication request (e.g., redirected login) to XYZ.com (the first IdP 202). If the user in turn decides to authenticate to the web service 206 by using/authenticating the user's first identity (e.g., John.Doe@XYZ.com) at 212, then a standard SSO procedure is performed at 214. The standard procedure at 214 may involve in detail (not shown):

The user logs in (for example by entering a username and password corresponding to the user's XYZ.com account) into the XYZ.com webpage;

Once authenticated at XYZ.com, XYZ.com sends a message with an ID assertion to the browser of the UE 106, in response to the redirected request at 210 from the web service 206;

The browser of the UE 106 forwards the received message having the ID assertion to the web service 206 as a proof of the user's first identity; and Because of the trust relationship between the web service 206 and XYZ.com (which may include some credential sharing), the web service 206 is able to verify the validity of the assertion message received from the UE 106, and the user becomes authenticated to the web service 206 that recognizes the first identity (provided by the first IdP 202).

Back at 212, if the first IdP 202 identifies that the authentication request at 210 came from a user that has a 3GPP-based (or other) IdP subscription with the second IdP 204 and determines that the user wishes to use that IdP subscription for authentication, then the first IdP 202 operates as a relaying party (RP) to initiate at 216 an authentication request using the second identity. The authentication request at 216 may, for example, request that the second identity be authenticated by the user and/or by the second IdP 204. In one embodiment, the first IdP includes a first component to provide IdP functionality and second component to provide the RP functionality. In one embodiment, the first and second components may be provided by software with state dependency between them. In other embodiments, the first and second components can include hardware, which may or may not necessarily operate along with software.

In one embodiment for the identification at 212 of the user's preference to use the second identity for authentication, both the information pertaining to the second IdP 204 and the user's IdP preference(s) can be provided by pre-configuration of the XYZ.com subscription or by piggybacking some signaling 218 to the redirected authentication request sent at 210. The signaling 218 could include, for example, the user's second identity piggybacked to the original redirected authentication request sent by the web service 206 at 210. In one embodiment, the signaling 218 may be added/piggybacked by the UE 106 to the original redirected authentication request received from the web service 206, for example, by having the UE 106 retrieve the second identity from local memory and appending the retrieved second identity to the original redirected authentication request received from the web service 206.

Based on the identification at 212, XYZ.com acts as "proxy SSO" and uses its relaying party (RP) functionality to get the user authenticated to XYZ.com using the IdP functionality of the second IdP. So unlike the operations performed at 214 in which the user may be asked to authenticate to XYZ.com (if not authenticated already) using the user's XYZ.com username/password, the 3GPP SSO system of the second IdP 204 is triggered to authenticate the user (for example, by authenticating the second identity). This authentication process involves the RP component of the first IdP 202 sending/redirecting at 220 the authentication request (from 216) to the UE 106 to request the user to authenticate the second identity. The UE 106 in turn redirects the authentication request received from XYZ.com to the 3GPP SSO system of the second IdP 204. A user ID 222 used in the authentication request at 220 can be, for example, the XYZ.com identity (the first identity) or the second identity, based for instance on the way the user is identified in the second IdP 204 for proxy SSO purposes.

At 224, the 3GPP SSO system of the second IdP 204 identifies the user, such as for example if the user is currently logged into the second IdP 204 and is therefore already authenticated at 226 since the user's second identity is already in use/authenticated at that time. If the second IdP 204 determines at 224 that the user is not yet authenticated to the 3GPP SSO system (such as if the user is not currently logged into the second IdP 204), the 3GPP SSO system of the second IdP 204 will first authenticate the user at 228 (for instance by requesting the UE 106 to provide a username and password or other authentication information to authenticate the user's second identity).

At 230 after authentication is completed, the second IdP 204 generates and sends an authentication assert message to the UE 106, which in turn sends the authentication assert message to XYZ.com so as to enable the RP component of the first IdP 202 to determine that the second identity has been authenticated. At 232, the RP functionality of XYZ.com verifies the validity of the received assert message, for example by using a trust relationship (which may include credential sharing) between the RP functionality of XYZ.com and the second IdP 204. As a result of the authentication, the RP function verifies the validity of the second identity (e.g., John.Doe@Operator.com) to the IdP function of XYZ.com at 232.

At 234, the IdP function of the first IdP 202 (XYZ.com) creates an assert message (e.g., an XYZ.com assert message that uses, verifies, is associated with, or otherwise corresponds to the first identity) as a response to the original authentication request received at 210 from the web service 206. The assert message at 234 is sent by the IdP function of the first IdP 202 to the UE 106, which in turn sends the assert message back to the web service 206 to complete the authentication flow at 236, so that the web service 206 can verify the assert message with the IdP function of the first IdP 202 using their existing trust relationship.

Thus, with one embodiment of the method 200 of FIG. 2, the user (through the second IdP 204) is able to provide the second identity at 224-228 in order to use the web service 206 that recognizes the first identity. Configuring the first IdP 202 as a proxy for the second IdP 204 enables the second identity to be used at 224-228 to ultimately obtain and complete the authorized access to the web service 206 at 234-236.

In the embodiment of the method 200 depicted in FIG. 2, two consecutive SSO flows (between the first IdP 202 and the second IdP 204 at 220 and 230) are provided where the first SSO provider (XYZ.com) has an RP function as well as an IdP function. Both SSO flows go through the UE 106. An embodiment of the proxy communication method 300 in FIG. 3 uses less direct interaction with the UE 106.

Figure 3:
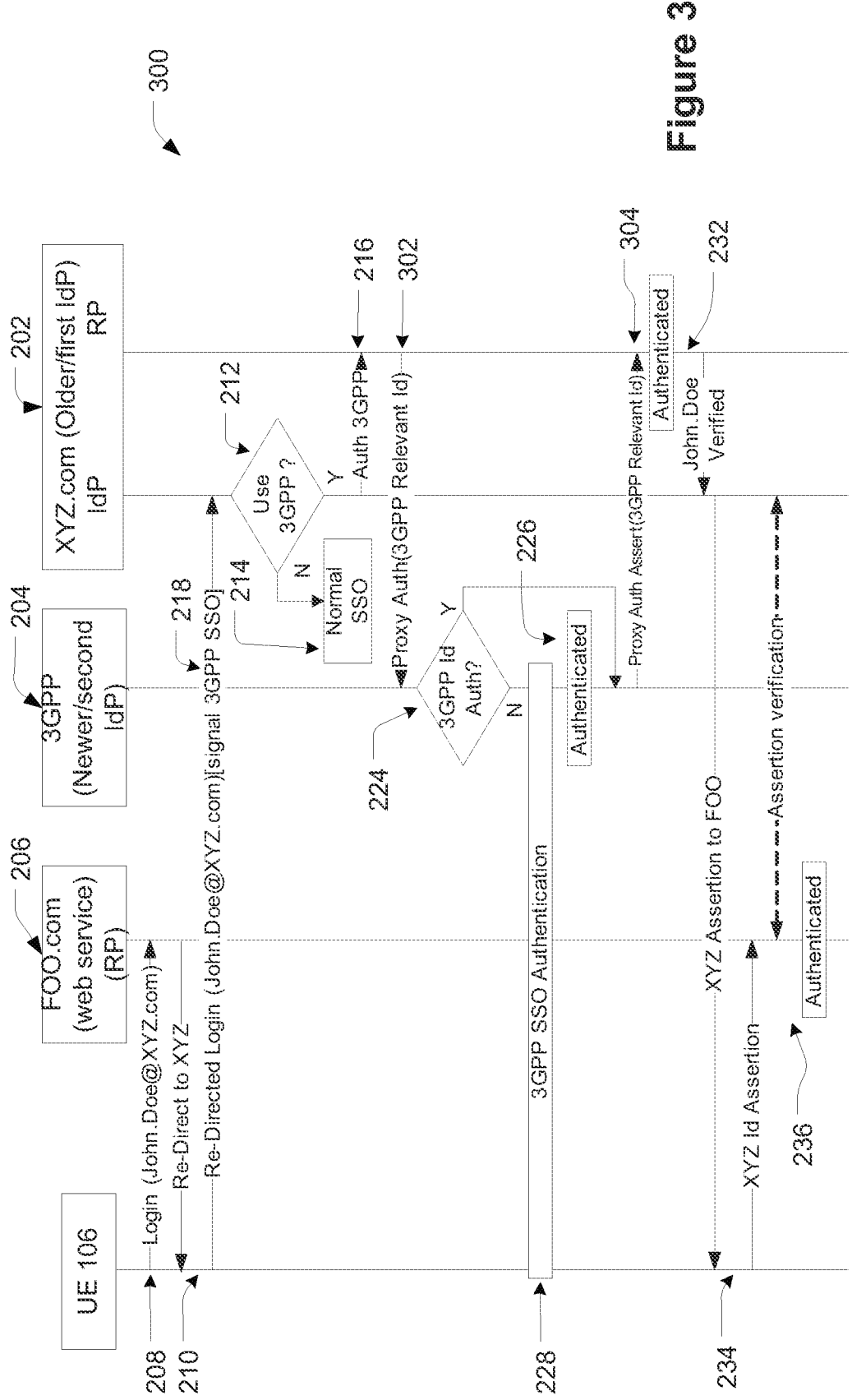
FIG. 3 illustrates another proxy communication method using SSO in accordance with some embodiments that may be used in the broadband wireless access network of FIG. 1.

In the embodiment of the method 300 of FIG. 3, similar operations/communications/elements as those shown in the method 200 of FIG. 2 are similarly labeled, and are not described again in detail, for the sake of brevity. In an embodiment of the method 300, the authentication request from XYZ.com goes directly at 302 to the 3GPP SSO system of the second IdP 204. This communication at 302 differs from the communication at 220 shown in FIG. 2, in that the UE 106 is not involved in the communication at 302. In one embodiment, a new type of message (different from the type of message sent at 220) is sent at 302.

An authentication assert message is sent directly at 304 from the second IdP 204 to XYZ.com. This communication at 304 also differs from the communication at 230 shown in FIG. 2, in that the UE 106 is not involved in the communication at 304. In one embodiment, a new type of message (different from the type of message sent at 230) is also sent at 304.

Thus with one embodiment of the method 300, less messages are communicated to/from the UE 106. In one embodiment, the method 300 uses a much stronger trust relationship between the various IdPs because an authentication is done on behalf of the user without the user/UE being directly involved in the communication exchanges.

Figure 4:
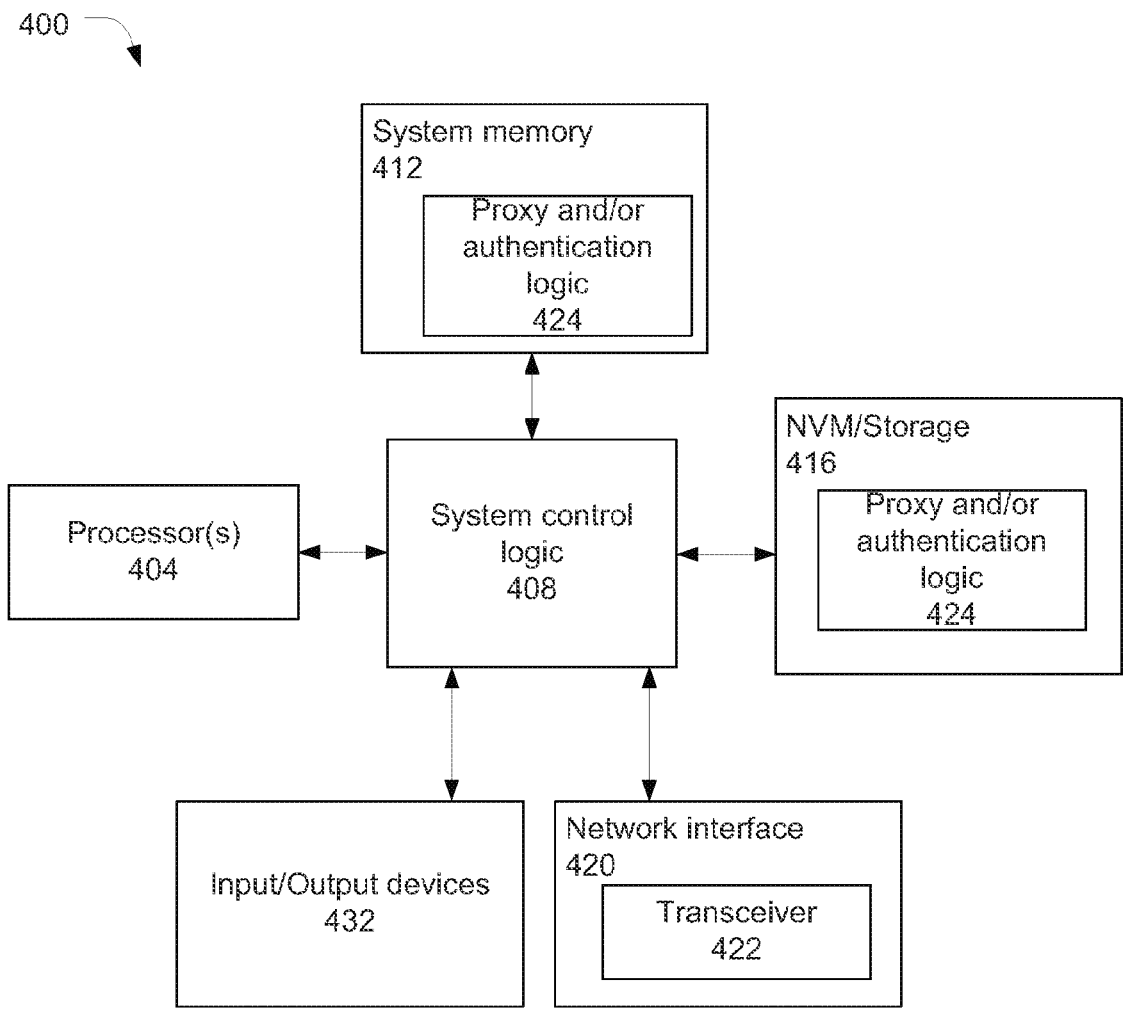
FIG. 4 illustrates a system that may be used to practice various embodiments described herein.

The proxy communication method/devices described herein may be implemented into a system using any suitable hardware and/or software to configure as appropriate. FIG. 4 illustrates, for one embodiment, an example system 400 comprising one or more processor(s) 404, system control logic 408 coupled to at least one of the processor(s) 404, system memory 412 coupled to system control logic 408, non-volatile memory (NVM)/storage 416 coupled to system control logic 408, and a network interface 420 coupled to system control logic 408. In various embodiments, the system 400 may be the UE 106, the eNB 108, the server(s) 110, or other device(s) in the BWA network 100. For example, the system 400 may be embodied as a server or other network device(s) of the first IdP 202 that is configured to perform the various operations of the first IdP 202 depicted in and described above with respect to FIGS. 2-3. The system 400 may additionally represent or be embodied as a server or network other device(s) of the second IdP 204 or of the web service 206 that is configured to perform the corresponding operations depicted in and described above with respect to FIGS. 2-3.

The one or more processor(s) 404 may include one or more single-core or multi-core processors. The one or more processor(s) 404 may include any combination of general-purpose processors and dedicated processors (e.g., graphics processors, application processors, etc.).

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, for example, for system 400. System memory 412 for one embodiment may include any suitable volatile memory, such as suitable dynamic random access memory (DRAM), for example.

NVM/storage 416 may include one or more tangible, non-transitory computer-readable media used to store data and/or instructions, for example. NVM/storage 416 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s) for example.

The NVM/storage 416 may include a storage resource physically part of a device on which the system 400 is installed or it may be accessible by, but not necessarily a part of, the device. For example, the NVM/storage 416 may be accessed over a network via the network interface 420.

System memory 412 and NVM/storage 416 may respectively include, in particular, temporal and persistent copies of proxy and/or authentication logic 424 to perform or cause to be performed the various proxy and authentication operations described above with respect to FIGS. 2-3. The proxy and/or authentication logic 424 may include instructions that if executed by at least one of the processor(s) 404 result in the system 400 performing proxy and/or authentication operations described herein. In some embodiments, the proxy and/or authentication logic 424, or hardware, firmware, and/or software components thereof, may additionally/alternatively be located in the system control logic 408, the network interface 420, and/or the processor(s) 404. In one embodiment, the proxy and/or authentication logic 424 may include the IdP component and the RP component of the first IdP 202, for example as software modules stored in the system memory 412 or other storage device in FIG. 4 and executable by the processor(s) 404.

Network interface 420 may have a transceiver 422 to provide a radio interface for system 400 to communicate over one or more network(s) and/or with any other suitable device. The transceiver 422 may be similar to, and substantially interchangeable with, transmitter 200 and/or receiver 300. Network interface 420 may include any suitable hardware and/or firmware. Network interface 420 may include a plurality of antennas to provide a MIMO radio interface or other wireless interface. Network interface 420 for one embodiment may include, for example, a network adapter, a wireless network adapter, a telephone modem, and/or a wireless modem. The network interface 420 and the transceiver 422 may be used in one embodiment to communicate the various signals for proxying and authentication as described above with respect to FIGS. 2-3.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

The system 400 may further include input/output (I/O) devices 432. The I/O devices 432 may include user interfaces designed to enable user interaction with the system 400, peripheral component interfaces designed to enable peripheral component interaction with the system 400, and/or perhaps sensors designed to determine environmental conditions and/or location information related to the system 400.

In various embodiments, the user interfaces could include, but are not limited to, a display (e.g., a liquid crystal display, a touch screen display, etc.), a speaker, a microphone, a still camera, a video camera, a flashlight (e.g., a light emitting diode flash), and a keyboard.

In various embodiments, the peripheral component interfaces may include, but are not limited to, a non-volatile memory port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 420 to communicate with components of a positioning network, e.g., a global positioning system (GPS) satellite.

In various embodiments, the system 400 may be a mobile computing device such as, but not limited to, a laptop computing device, a tablet computing device, a netbook, a smartphone, etc. In various embodiments, system 400 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein.

For example, while FIGS. 2-3 have described a "multi-hop" technique in which the authentication flow is between the web service 206, the first IdP 202, and the second IdP 204, other embodiments are possible wherein there are several more "hops" involving additional IdPs. As an illustration, there may be the first IdP 202 that communicates with the second IdP 204, which in turn may be configured to operate as a RP to communicate with a third IdP, and so on.

Therefore, it is manifestly intended that embodiments described herein be limited only by the claims and the equivalents thereof.

What is claimed is:

1. An apparatus, comprising:
one or more non-transitory, computer-readable media having instructions; and
one or more processors coupled with the one or more non-transitory, computer-readable media, the one or more processors to execute the instructions to cause a first identity provider (IdP), which provides a first identity associated with a user, to operate as a proxy, for a second IdP that provides a second identity associated with the user, to enable the second identity to be used to obtain authorized access to a service of a service provider that recognizes the first identity,
wherein the service provider is distinct from the first and second IdPs and to operate as the proxy to enable the second identity to be used to obtain authorized access to the service, the first IdP is to:
receive, from a user equipment (UE), an authentication request for the service, wherein the authentication request is redirected from the service provider to the apparatus;
send, based on the authentication request, a communication directly to the second IdP to initiate an authentication process with the second IdP using the second identity; and
if the second identity is determined by the first IdP to be authenticated by the authentication process, send to the service provider through the UE an assert message associated with the first identity to enable the authorized access to the service.

2. The apparatus of claim 1 wherein the service includes a web service and wherein the first IdP is to operate as the proxy in a wireless or wired communication network.

3. An article of manufacture, comprising:
a non-transitory computer-readable medium having computer-readable instructions stored thereon and executable by a processor of a first identity provider (IdP) corresponding to a first identity, to:
receive, from a user equipment (UE), a request to authenticate a first identity that is redirected from a service provider to the first IdP;
in response to receipt of the request to authenticate the first identity, determine that the first identity is linked to a user having a second identity corresponding to a second IdP;
obtain, directly from the second IdP, an assertion that the second identity is authenticated with the second IdP; and
in response to the obtained assertion that the second identity is authenticated with the second IdP, transmit an assert message to the service provider through the UE to assert verification of the first identity to enable authorized access of the UE to a service of the service provider that recognizes the first identity.

4. The article of manufacture of claim 3 wherein to determine that the first identity is linked to the user having the second identity, the computer-readable instructions are executable by the processor to check a stored subscription that pertains to the second identity.

5. The article of manufacture of claim 3 wherein the computer-readable medium further includes computer-readable instructions that are executable by the processor to:
provide the first identity;
enable the service to be accessed according to a single sign-on (SSO) process using the first identity; and
enable the service to be accessed according to the SSO process using the second identity.

6. The article of manufacture of claim 3 wherein the computer-readable medium further includes computer-readable instructions that are executable by the processor to:
in response to a determination that the second identity is not requested to be used to access the service, assert verification of the first identity to enable the first identity to be used to access the service.

7. One or more non-transitory, computer-readable media having instructions that, when executed by a network device implements a first identity provider (IdP) that provides a first identity associated with a user as a proxy for a second IdP that provides a second identity associated with the user to enable the second identity to be used to obtain authorized access to a service of a service provider that recognizes the first identity, wherein the service provider is distinct from the first and second IdPs and the first IdP is to:
receive an authentication request from a user equipment for the service, wherein the authentication request is redirected from the service provider to the network device;
send, based on the authentication request, a communication directly to the second IdP to initiate an authentication process with the second IdP for the second identity;
determine that the second identity is to be authenticated by the authentication process; and
send, based on said determination, to the service provider through the UE an assert message associated with the first identity to enable the authorized access to the service.

8. The one or more non-transitory, computer-readable media of claim 7, wherein the service includes a web service and wherein the first IdP is to operate as the proxy in a wireless or wired communication.

* * * * *